July 20, 1943.   H. F. SOPER   2,324,734
DISPENSING APPARATUS AND INTERLOCKING MECHANISM THEREFOR
Filed Oct. 16, 1940   3 Sheets-Sheet 2

INVENTOR
Henry F. Soper
BY
August, Meary & Campbell
his ATTORNEYS

INVENTOR
Henry F. Soper
BY
his ATTORNEYS

Patented July 20, 1943

2,324,734

UNITED STATES PATENT OFFICE 2,324,734

DISPENSING APPARATUS AND INTERLOCKING MECHANISM THEREFOR

Henry Felix Soper, East Orange, N. J., assignor to Neptune Meter Company, a corporation of New Jersey Application October 16, 1940, Serial No. 361,355

17 Claims. (Cl. 221—101)

This invention relates to liquid dispensing apparatus and more particularly to an interlocking mechanism for dispensing apparatus or the like having manually settable compensating means to insure proper setting thereof.

It has heretofore been proposed to provide meters of liquid dispensing apparatus with means to compensate for variations in the volume of a liquid caused by changes in the temperature thereof. This was accomplished by providing the meter with means adjustable to vary the capacity of the meter and thereby compensate for volumetric changes in the liquid, due to the contraction or expansion of the liquid at temperatures different from a predetermined or standard temperature, the adjustable means to be manually set to agree with the instant temperature conditions of the liquid being handled.

To obviate any fraudulent or improper use of such a manually settable means, I have invented a new interlocking control for apparatus so equipped, one of the objects of the invention being to provide the apparatus with means to control the operation thereof in a manner to indicate whether or not the compensating means has been properly set.

Another object of the invention is to provide an interlocking control operable to compare the positions of two separately movable means to determine the operation of the control.

A further object of the invention is to provide liquid dispensing apparatus, equipped with a register and a meter having liquid condition compensating means, with means to prevent the preconditioning of the register for dispensing purposes unless the compensating means has been previously set to correspond substantially with the condition of the liquid to be dispensed.

An additional object of the invention is to provide a liquid dispensing apparatus, equipped with a ticket printing register and a meter having liquid condition compensating means, with means operable to prevent the printing operation should the compensating means be improperly set.

A still further object of the invention is to provide a dispensing apparatus with means to permit a dispensing operation only when the apparatus is set to compensate for an existing difference between the instant condition of the liquid and a predetermined standard.

The above mentioned and additional objects and features of the invention are obtained by providing a liquid dispensing apparatus comprising a meter having a manually settable liquid condition compensating means with means for indicating the instant condition of the liquid together with an interlocking control feature for preventing normal operation of the dispensing apparatus should the compensating means not be set to correspond substantially with the indicated condition of the liquid. The control of the dispensing apparatus may take one of several different forms. In each form, however, an interlocking mechanism is provided including a control element movable between operative and inoperative positions. The position of the control element is controlled by the interlocking mechanism which includes a planetary movement for comparing the indicated condition, such as the temperature of the liquid being dispensed, and the position at which the compensating means has been set. Where the condition of the liquid and the setting of the compensating means exactly or substantially correspond, the control element will be so positioned as to permit normal dispensing operations. Should the condition of the liquid and the setting of the compensating means not correspond, the control element will then be displaced from the operative position to an inoperative position, whereupon normal operation of the dispensing apparatus is prevented.

The interlocking control feature of the invention may be associated with various makes of dispensing apparatus with or without registering means. It should also be understood that my invention is not limited to liquid dispensing apparatus but is readily adapted for use with various other apparatuses as well.

For the purpose of illustrating the invention a dispensing apparatus provided with a ticket printing register has been selected. This register is of the type adapted to be preconditioned by the insertion of a ticket and the performance of a resetting operation prior to dispensing of liquid, the ticket being printed upon the termination of the dispensing operation to record the amount dispensed. The control feature in one form of the invention prevents the resetting of the register when the compensating means have not been properly set, while in another form the control feature prevents the insertion of a ticket.

Where the dispensing apparatus includes an automatic cut-off mechanism adapting the apparatus to be preset to deliver a predetermined amount and to automatically discontinue delivery when such amount has been dispensed, the control feature of the invention can be advantageously associated with such cut-off mechanism.

For a better understanding of the invention, reference is had to the following detailed description, to be read in connection with the accompanying drawings, in which:

Figure 1 is a vertical sectional view with parts broken away showing a dispensing apparatus provided with one of the embodiments of the present invention;

Figures 2 and 3 are views in vertical elevation taken substantially along lines 2—2 and 3—3, respectively, of Figure 1;

Figure 1:
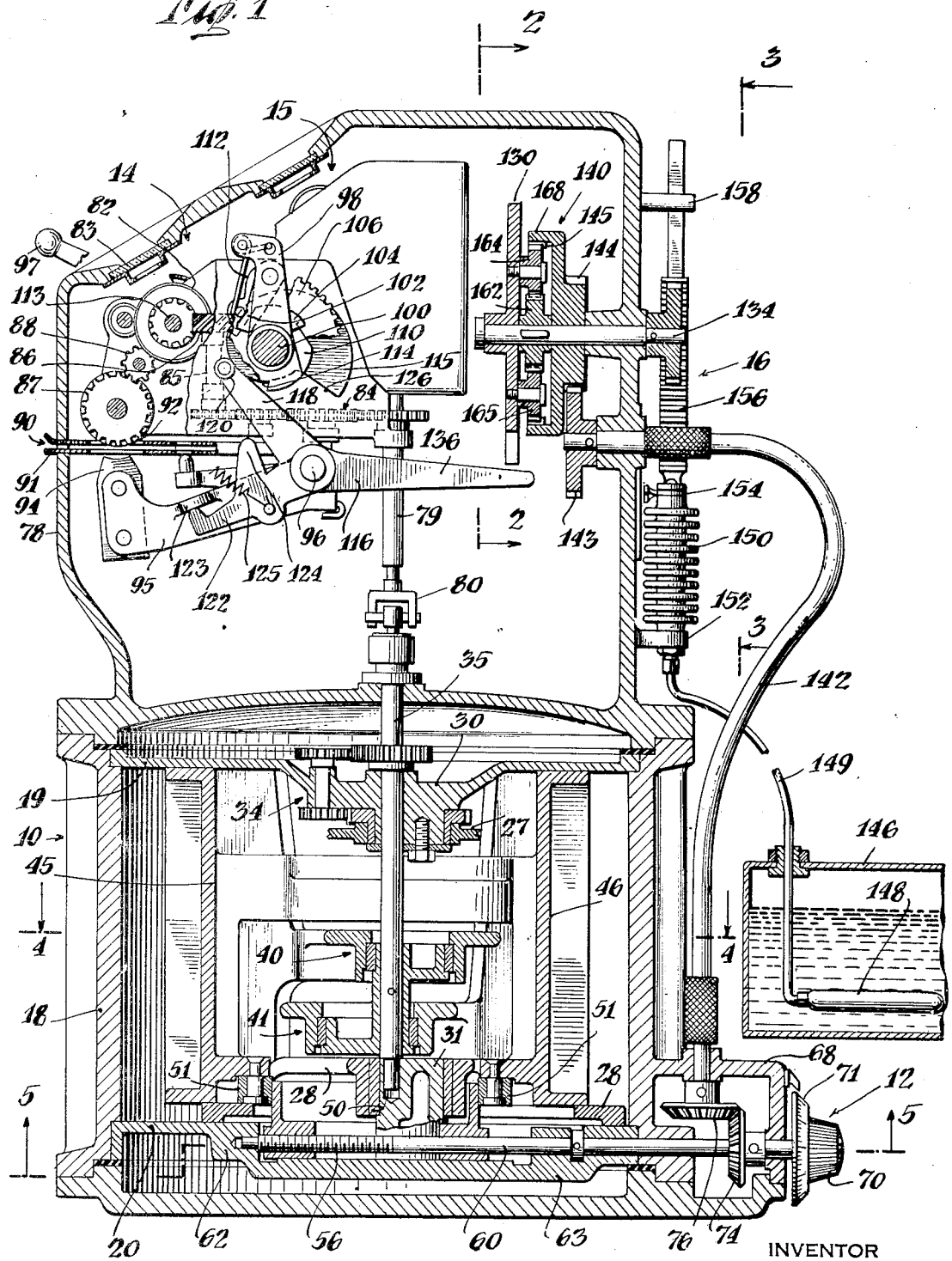
Figure 2:
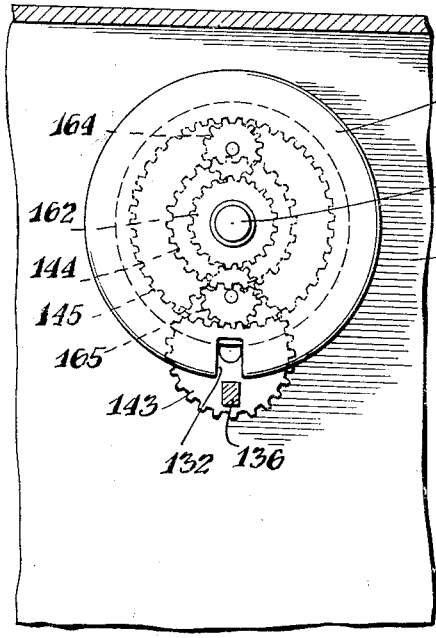

Referring to Figs. 1 to 5 of the drawings, a form of dispensing apparatus is shown for purposes of illustrating the present invention. This apparatus comprises a meter 10 having manually settable capacity variating or compensating means 12 and a ticket printing register 14 including a predetermined auto-stop device 15 shown in combination with a form of my novel interlocking control mechanism 16. The meter 10 and the capacity compensating means 12 selected for purposes of illustration is of the type shown in the co-pending application of Charles S. Hazard, Serial No. 338,305, filed June 1, 1940, now Patent No. 2,286,411, issued June 16, 1942. The ticket printing register is of the type disclosed in the patent to Hazard et al. No. 2,126,256.

To better understand the meter and the associated capacity compensating feature, the construction thereof will be briefly described.

The meter 10 comprises a casing 18 provided with end plates 19 and 20 to form a chamber 21 having an inlet 22 and an outlet 23. A rotor 24 is mounted within the chamber 21 and is provided with a cylindrical body portion disposed in sealing relation with a portion 25 of the walls of the chamber. The opposite wall surface 26 of the chamber is spaced from the rotor 24 to provide a passage for the flow of liquid from the inlet 22 to the outlet 23. The rotor is formed with end members 27 and 28 (Fig. 1) which are provided with suitable hub portions surrounding bosses 30 and 31 of the end plates 19 and 20, respectively. The end member 27 of the rotor is suitably geared to the meter shaft 35 at 34. The wall surface 26 (Fig. 4) cooperates with a series of slidable vanes 36, 37, 38 and 39 carried by the rotor 24 and are operated by eccentrics 40 and 41 carried by the shaft 35, to successively form pockets 42 to control the passage of liquid between the inlet and outlet openings.

Figure 5:
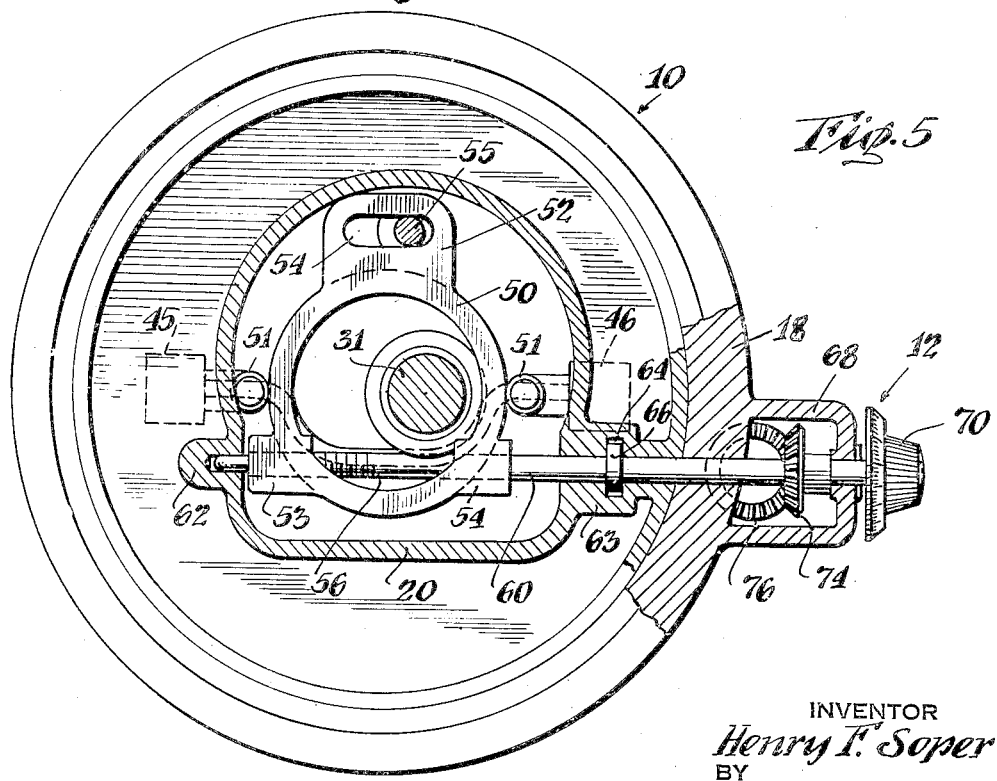
Figure 5 is a bottom plan view with parts in section showing the adjustment feature of the compensating means, taken substantially along line 5—5 of Figure 1.

Referring to the capacity compensating means with which the meter 10 is provided (Figs. 1, 4 and 5) the rotor 24 carries two capacity compensating piston-like elements 45 and 46, arranged for reciprocating movement radially of the rotor similarly as in the case of the vanes 36 to 39. The radial positioning of the pistons 45 and 46 and therefore the degree of compensation effected during rotation of the rotor 24 is controlled by an adjustable eccentric 50 against which the rollers 51 bear. The adjustable eccentric 50 is shown in Figs. 1 and 5 as being provided with suitable mounting extensions, such as the member 52 and the bosses 53 and 54. The member 52 is provided with a slot 54 which receives a stationary pin 55. The boss 53 is threaded to receive the threaded portion 56 of a shaft 60 which extends through the bosses 53 and 54. The inner end of the shaft 60 is received in a bearing 62 while the opposite end of the shaft is received in a bearing 63, the bearings being formed in the end plate 20. The bearing 63 is provided with an enlarged recess 64 to receive a collar 66 secured to the shaft 60 to maintain the shaft against axial movement. The shaft 60 is extended through the casing 18 and an associated compartment 68, the outer end of the shaft being provided with a manually actuatable knob 70. The knob 70 (Fig. 1) is calibrated at 71 to indicate the capacity correction at which the compensating means is set. Within the compartment 68 a bevel gear 74 is carried by the shaft 60 for meshing engagement with a bevel gear 76 of the interlocking mechanism to be hereinafter described.

Mounted on the casing 18 of the meter 10 is a casing 78 enclosing the ticket printing register 14 and an automatic cut-off device 15. The meter shaft 35 is coupled to the register drive shaft 79 at 80. The ticket printing feature of the register 14 comprises a plurality of numeral wheels 82 which are viewable through the window 83. The numeral wheels 82 are driven from the shaft 79 through a gear train 84, shaft 85 and a worm and worm gear connection 86. The printing wheels 87 which correspond to the numeral wheels 82 are connected thereto by idler gears 88 so that the printing wheels are operated in unison with the wheels 82 during both counting and resetting operations. Below the printing wheels a slot 90 is defined by a pair of plates 91 adapted to receive a ticket on which an impression is made from the printing wheels through apertures 92 in the plates 91 by means of hammers 94 of an oscillatable printing platen 95 rotatably mounted on shaft 96.

The operation of the printing hammers 94 and the resetting of the numeral and printing wheels 82 and 87 are determined by a cyclic operation of an oscillatable reset lever 97 which controls the oscillations of an arm 98 rotatably mounted on a cam shaft 100 (Fig. 1). The arm 98 carries a pawl 102 adapted to engage a three-toothed ratchet 104, fixed to the shaft 100 and operable to turn the shaft one-third of a revolution each time the arm 98 is oscillated by an action depressing the lever 97. A gear 106 rotatably mounted on the shaft 100 carries a second ratchet 110 engageable by a second pawl 112. The gear 106 meshes with a gear (not shown) carried by a reset shaft 113 upon which the numeral wheels 82 are mounted.

One of the notches 114 of the ratchet 104 is of less depth than the other two notches. This enables the pawl 102 to lift the pawl 112, which in part overlaps the pawl 102, out of engagement with the ratchet 110 during every third actuation of the lever 97. During this third actuation of the lever 97 the printing mechanism is actuated while the reset shaft 113 and therefore the printing wheels 87 maintain stationary.

The shaft 100 is provided with a cam 115 designed to actuate a three-armed member 116. One of the arms 118 is provided with a roller 120 adapted to engage the outer surface of the cam 115. Another of the arms 122 is adapted to engage an abutment 123 on the platen 95 to effect a printing operation when the cam is moved to the point of releasing the roller 120. The arm 122 is also adapted by means of a lug 124 to engage a portion of the register frame to allow for a clearance and permit the hammers 94 to gravitate free of the ticket after a printing operation. The third arm 136 of the member 116 cooperates with the interlocking control to be later described. The member 116 is biased into cam engaging position by a suitable spring connection 125.

During the resetting movements of the shaft 100, the cam 115 is moved from the position shown in Fig. 1 through two-thirds of a rotation so that the roller 120 comes to rest on the high portion of the cam and the reset shaft 113 is turned sufficiently to insure complete resetting of the numeral and printing wheels 82 and 87. Upon the succeeding third of a rotation of the shaft 100, the abrupt portion 126 of the cam passes beneath the roller 120 permitting the spring to rotate the member 116 and platen 95 clockwise to effect the printing operation.

When this type of ticket printer is used on a delivery truck, the reset lever ordinarily is not operated to reset the numeral wheels after a printing operation until the truck reaches a new destination for the delivery of additional gasoline or other liquid. The ticket is then inserted in the slot 90 and the reset lever operated twice to reset the mechanism. Liquid is then delivered and upon completion of the delivery, the reset lever is depressed a third time to turn the shaft 100 through the final third of a revolution to actuate the printing mechanism and print the ticket. During the final third of a revolution of the shaft 100 when the printing operation is being performed the resetting shaft 113 remains at rest due to the raising of the pawl 112.

Referring now to the interlocking mechanism (Figs. 1, 2 and 3), a control element 130 in the form of a disc having a slot 132 in the peripheral edge thereof is shown rotatably mounted on a shaft 134 suitably supported through the casing 78. The slot 132 of the control element is adapted to cooperate with the arm 136 of the member 116 to control the operation of the ticket printing register. When the slot 132 is in operative position it will receive the arm 136 to permit the resetting of the numeral and printing wheels 82 and 87 preparatory for a dispensing operation. Such co-operation of the control element indicates that the compensating means 12 associated with the meter 10 is properly set to compensate for any difference existing between the condition of the liquid being dispensed and a predetermined standard. Should the compensating means 12 not be properly set, the control element 130 would then be in an inoperative position so that the slot 132 would not receive the member 136 when a resetting or preconditioning operation is attempted. The attendant would then realize the trouble and thereupon correct the setting of the compensating means.

The position of the control element 130 is determined by a planetary gearing 140 which compares the setting of the compensating means 12 with respect to the actual condition of the liquid. While the illustration shows means for compensating for change in volume of the liquid due to changes in temperature, the compensation might be provided for other conditions, such as for differences in viscosity, pressure, etc., from a corresponding predetermined standard.

Figure 3:
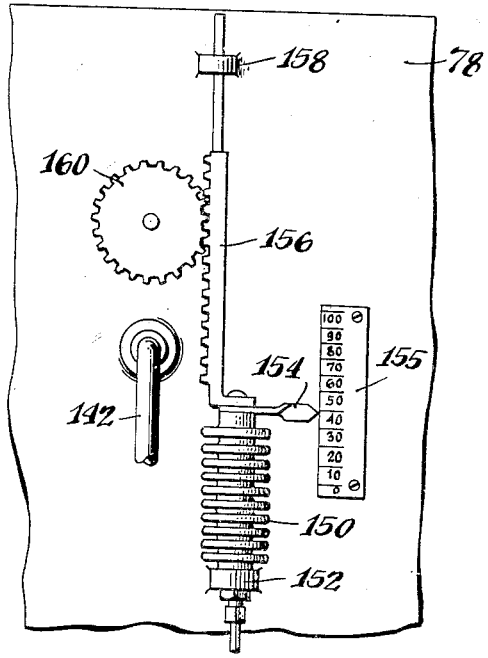

The comparison is performed through a connection from the shaft 60 of the compensating means 12 which includes the bevel gears 74 and 76, a flexible drive shaft 142 and a gear 143 which meshes with the external teeth 144 of a gear 145 rotatably supported on the shaft 134. The temperature of the liquid at the source of supply in the associated piping 146 is measured by a suitable thermal element 148, which, through the medium of a fluid which communicates through a tube 149, controls the action of a Sylphon bellows 150 (Figs. 1 and 3). One end of the bellows is supported by a bracket 152 and the other end is connected to an index pointer 154 associated with a temperature scale 155 to indicate the temperature of the liquid. Also connected to the movable end of the bellows 150 is a rack 156 slidably supported through a bracket 158 and meshing with a pinion 160 carried by the shaft 134. Any movement of the rack 156 is thereby transmitted through the shaft 134 to a sun gear 162 carried by the shaft 134. The control element 130 rotatably supports a pair of planet gears 164 and 165, at points diametrically opposite the shaft 134 for meshing engagement with the sun gear 162. The gear 145 is provided with a peripheral flange 168 having internal gear teeth in mesh with the planet gears 164 and 165.

When the compensating means 12 remains at one setting any change in temperature of the liquid causing the rack to move rotates the sun gear 162 and drives the planet gears 164 and 165. The planet gears being in mesh with the normally stationary gear 145 causes the control element 130 to change its position. Likewise, when the setting of the compensating means 12 is changed, the movement of the shaft 60 is transmitted through the bevel gear 74 and 76, flexible shaft 142 and the gear 143 to the gear 145, which then drives the planet gears about the sun gear 162. This also changes the position of the control element 130. When the setting of the compensating means 12 corresponds substantially with the temperature of the liquid, the control element 130 will be in a position to receive the arm 136 and permit a normal dispensing operation.

Since deliveries of oil or gasoline do not take much time, the temperature of the liquid is not apt to change sufficiently to vary the position of the control during a dispensing operation. Thus for normal dispensing operations the presetting of the compensating means 12 will permit the reconditioning or resetting of the ticket printing register so that at the end of the dispensing operation a ticket may be printed showing the exact amount delivered.

While the control element 130 (Fig. 1) is shown associated with a particular part of the registering mechanism which operates to control the resetting of the register and therefore the printing operation, it is to be understood that the control element may also be associated with other parts of the register, or with registers of widely different constructions and uses, and with other parts of the dispensing apparatus or with apparatus designed for still other purposes.

Figure 7:
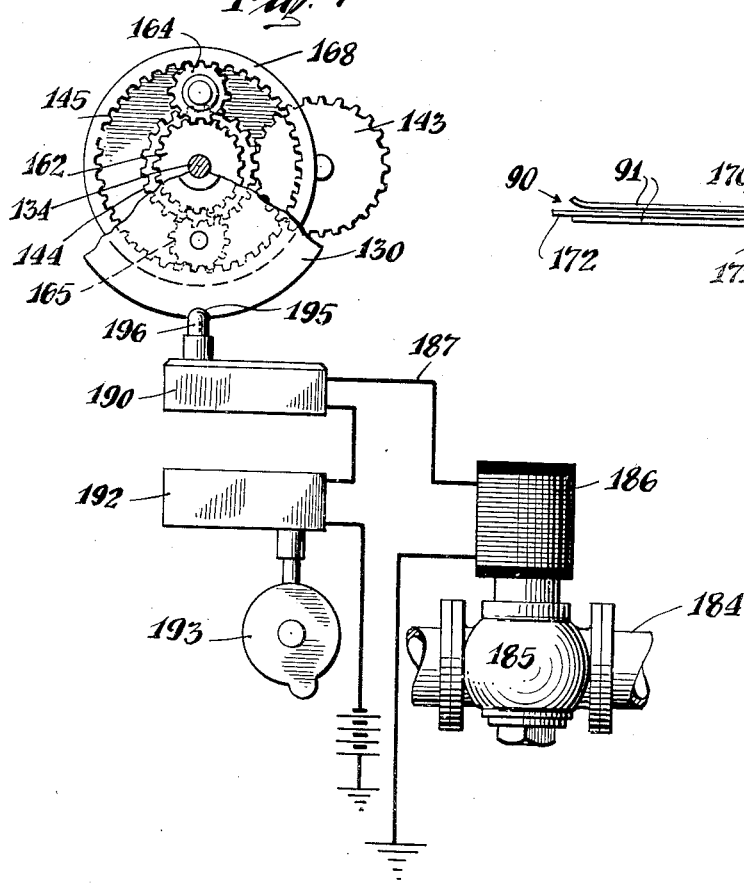
Figure 7 is a diagrammatical illustration of another modified arrangement of the invention.
Figure 6:
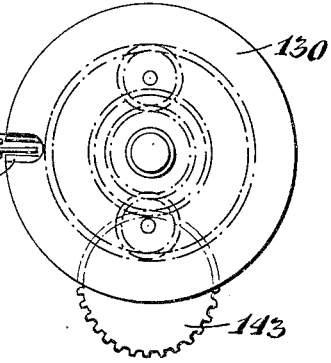
Figure 6 is a view of a modified form of the invention.
Figure 4:
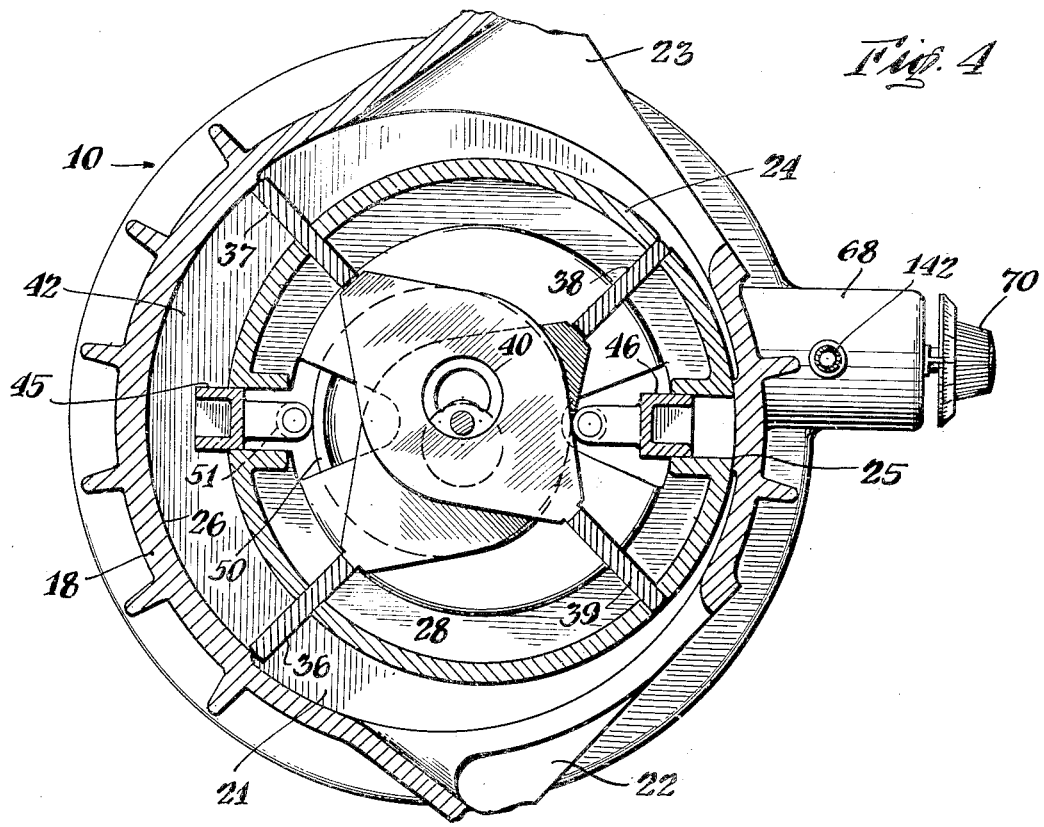
Figure 4 is a horizontal sectional view showing the meter and compensating means taken substantially along line 4—4 of Figure 1.

Referring to Fig. 6, a modified arrangement of the invention is shown in which the control element 130 is provided with a slot 170 having knife edges 171 adapted when in operative position to be in alignment with the ticket receiving slot 90. Should the control element 130 be moved to inoperative position, that is, with the slot 170 out of alignment with the slot 90, the ticket 172 could not then be properly positioned within the slot to receive a printed record. Such refusal of the register to receive the ticket would then indicate to the attendant that the compensaing means is improperly set. Any change in the setting of the knob 71 after the ticket has been inserted will cause the control element 130 to move relative to the slot, and by means of the knife edges 171, cut or otherwise damage the ticket. To indicate that any cut or damage to the ticket in the portion received by the control element indicates an improper operation, suitable notice is printed on the ticket, such as: "Should the ticket be cut or damaged in this area, the dispensing apparatus for this delivery was improperly set." This serves as a notice to customers and to the home office that the delivery was not properly performed.

Where the dispensing apparatus 14 is provided with a predetermining automatic cut-off feature, such as the attachment 15 which enables the register to be preset to deliver a predetermined amount of liquid and then stop, the control element 130 may be advantageously associated with the cut-off feature thereof. While the automatic cut-off attachment 15 may take any one of several different forms and be used separately or in association with apparatus used for purposes other than the dispensing of liquid, I have shown in Fig. 7, for purposes of illustration, a fragmentary part only of an automatic cut-off device. The piping 184 associated with the meter 10 is provided with an electromagnetic valve 185 which, when energized, is adapted to maintain the valve in open position. The solenoid 186 thereof is included in an electric circuit 187 containing two suitable switches 190 and 192. The switch 192 is associated with a cam 193, which is adapted to be preset to actuate the switch when the predetermined amount of liquid has been delivered, thereby effecting the closing or maintenance of the valve 185 in closed position. The switch 190 which is in series with the switch 192, has a stem 195 arranged in cooperative relation with a suitable recess 196 contained in the control element 130. When the stem 195 is received in the recess 196, the switch will be in closed position, thereby permitting energization of the circuit 187 and the opening of the valve 185. Should the control element 130 move out of the operative position shown in Fig. 7, either in response to a change in the setting of the compensating means or by a change in the indicated temperature, the switch 190 will be actuated to break the controlling circuit to the solenoid 186. This will stop or prevent the establishment of a flow of liquid through the meter thereby indicating to the attendant that the setting of the compensating means no longer corresponds to the temperature of the liquid being handled. In order to establish or continue the delivery of liquid, the compensating means will then need readjustment.

In each of the illustrated forms of my invention, I have shown an apparatus having means movable in response to change in the condition of a variable and another means movable to represent a selected condition in combination with a control associated with some operable part of the apparatus and movable relative to a predetermined or operative position together with means for integrating the positions of the two movable means to determine the positioning of the control. My invention thus provides an interlocking mechanism responsive to two different variables to maintain normal operation of an apparatus with which it is associated only while the conditions represented by the two variables substantially correspond.

While I have shown and described one particular form of interlocking means and several different arrangements for controlling operations of a dispensing apparatus, it will be understood that many modifications of the interlocking mechanism and the coactive arrangements thereof with respect to various parts of the dispensing apparatus and adaptations for use with other apparatus and more than two variables may be made without departing from the spirit of the invention. It should, therefore, be further understood that the forms of the invention herein illustrated and described are intended to be illustrative of the invention only and not as limiting the scope thereof.

I claim:

1. In liquid dispensing apparatus, a liquid measuring device, means to indicate the condition of liquid encountered in the operation of said device, means manually settable to vary the operation of said device in accordance with the indicated condition of said liquid, and interlocking means to prevent operation of said device except when the manually settable means is set in agreement with the indicated condition of said liquid.

2. In liquid dispensing apparatus, a liquid measuring device, means to indicate the condition of liquid encountered in the operation of said device, means manually settable to vary the operation of said device in accordance with the indicated condition of said liquid, a movable element operable when moved away from a predetermined position to prevent operation of said device, and means operatively associated with the condition indicating means and the manually settable means to maintain said element in said predetermined position only while the setting of said settable means substantially corresponds with the indicated condition of said liquid.

3. In liquid dispensing apparatus, a liquid measuring device, means to indicate the condition of liquid encountered in the operation of said device, means manually settable to vary the operation of said device in accordance with the indicated condition of said liquid, a movable element operable when moved away from a predetermined position to prevent operation of said device, and means including a planetary movement having parts operatively connected to the indicating means, the manually settable means and said element to maintain said element in said predetermined position only while the setting of said settable means substantially corresponds with the indicated condition of said liquid.

4. In liquid dispensing apparatus, a liquid measuring device, means to indicate the condition of liquid encountered in the operation of said device, means manually settable to vary the operation of said device in accordance with the indicated condition of said liquid, an element movable relative to a predetermined position to control the operation of said device, and means controlling the position of said element comprising a sun gear operatively connected to said condition indicating means, a planet gear rotatably carried on said element and meshing with said sun gear, and a gear operatively connected to said manually settable means meshing with said planet gear.

5. In liquid dispensing apparatus comprising a meter, capacity compensating means for said meter, means movable in response to change in a condition of the liquid being dispensed and means manually operable to set said compensating means in accordance to the condition of the liquid; the combination therewith of means including an element movable relative to a predetermined position to control the operation of the dispensing apparatus, and means operable upon variance between the position of said movable means and the setting of said manually operable means to move said element with respect to said predetermined position.

6. In liquid dispensing apparatus comprising a meter, capacity compensating means for said meter, means for indicating the condition of a variable encountered in the dispensing of liquids and means manually operable to set said compensating means in accordance to the indicated condition of said variable; the combination therewith of means including an element movable relative to a predetermined position to control the operation of the dispensing apparatus, and means operatively associated with said indicating means and said manually operable means to maintain said element in said predetermined position only while the setting of said manually operable means corresponds substantially with the indicated condition of said variable.

7. In liquid dispensing apparatus comprising a meter, capacity compensating means for said meter, means for indicating the temperature of the liquid being dispensed and means manually operable to set said compensating means in accordance to the indicated temperature; the combination therewith of means including an element movable relative to a predetermined position upon variance between the setting of said manually operable means and the indicated temperature to prevent operation of the dispensing apparatus, and means operatively associated with said indicating means and said manually operable means to maintain said element in said predetermined position only while the setting of said manually operable means corresponds substantially with the indicated temperature.

8. In liquid dispensing apparatus comprising a meter, capacity compensating means for said meter, means movable in response to change in a condition of the liquid being dispensed and means manually operable to set said compensating means in accordance to the condition of the liquid; the combination therewith of means including an element movable relative to a predetermined position to control the operation of the dispensing apparatus, and means controlling the position of said element including a planetary movement comprising a plurality of parts, one of the parts being operatively connected to said movable means, another of the parts being operatively connected to said manually operable means and still another of the parts being operatively connected to said element.

9. In liquid dispensing apparatus comprising a meter, capacity compensating means for said meter, means movable in response to change in a condition of the liquid being dispensed and means manually operable to set said compensating means in accordance to the condition of the liquid; the combination therewith of means including an element movable relative to a predetermined position to control the operation of the dispensing apparatus, and interconnecting gearing controlling the position of said element comprising a sun gear operatively connected to said movable means, a planet gear rotatably carried by said element and meshing with said sun gear and means having teeth meshing with said planet gear and operatively connected to said manually operable means.

10. In liquid dispensing apparatus comprising a meter, capacity compensating means for said meter, means movable in response to change in a condition of the liquid being dispensed and means manually operable to set said compensating means in accordance to the condition of the liquid; the combination therewith of means including a ticket printing register driven by said meter and an element movable between operative and inoperative positions to control the printing of a ticket, and means operable in response to variance between the setting of said manually operable means and the condition of the liquid to determine the position of said element.

11. In liquid dispensing apparatus comprising a meter, capacity compensating means for said meter, means movable in response to change in a condition of the liquid being dispensed and means manually operable to set said compensating means in accordance to the condition of the liquid; the combination therewith of a register driven by said meter, said register being of the type adapted to be reset prior to each dispensing operation, an element movable between operative and inoperative positions to control the resetting of said register, and means operable in response to variance between the setting of said manually operable means and the condition of the liquid to determine the position of said element.

12. In liquid dispensing apparatus comprising a meter, capacity compensating means for said meter, means movable in response to change in a condition of the liquid being dispensed and means manually operable to set said compensating means in accordance to the condition of the liquid; the combination therewith of means including a ticket printing register driven by said meter and an element movable between ticket obstructing and ticket non-obstructing positions, and means operatively associated with said movable means and said manually operable means to maintain said element out of said ticket obstructing position only while the setting of said manually operable means corresponds substantially with the condition of said liquid.

13. In liquid dispensing apparatus comprising a meter, capacity compensating means for said meter, means movable in response to a change in condition of the liquid being dispensed and means manually operable to set said compensating means in accordance to the condition of the liquid; the combination therewith of means including a ticket printing register driven by said meter and a slotted element adapted to receive the ticket for printing purposes when said element is in a predetermined position, and means operatively associated with said movable means and said manually operable means to maintain said element in said predetermined position only while the setting of said manually operable means corresponds substantially with the condition of said liquid.

14. In liquid dispensing apparatus comprising a meter, capacity compensating means for said meter, means movable in response to a change in condition of the liquid being dispensed and means manually operable to set said compensating means in accordance to the condition of the liquid; the combination therewith of means including means to control the flow of liquid through said meter and a movable element cooperatable therewith in one position to permit liquid flow and in another position to prevent liquid flow, and means operable in response to change in corresponding positions of said movable means and said manually operable means to determine the position of said element.

15. In liquid dispensing apparatus comprising a meter, capacity compensating means for said meter, means movable in response to change in a condition of the liquid being dispensed and means manually operable to set said compensating means in accordance to the condition of the liquid; the combination therewith of a valve to control flow of liquid through said meter, means for controlling the opening and closing of said valve, a movable element cooperatable with said valve controlling means to permit the opening of said valve when in one position and to effect the closing of the valve when in another position, and means operable in response to change in corresponding positions of said movable means and said manually operable means to determine the position of said element.

16. In liquid dispensing apparatus comprising a meter, capacity compensating means for said meter, means movable in response to change in a condition of the liquid being dispensed and means manually operable to set said compensating means in accordance to the condition of the liquid; the combination therewith of means including an automatic cut-off device for controlling the flow of a predetermined amount of liquid through said meter and an element operable when in one position to permit the establishment of liquid flow by operation of said device, and when in another position to prevent the flow of liquid, and means operable in response to change in corresponding positions of said movable means and said manually operable means to determine the position of said element.

17. In liquid dispensing apparatus comprising a meter, capacity compensating means for said meter, means movable in response to change in a condition of the liquid being dispensed and means manually operable to set said compensating means in accordance to the condition of the liquid; the combination therewith of an electromagnetic valve for controlling flow of liquid through said meter, means including a switch to control said valve, an element operable in one position to maintain said switch closed and in another position to maintain said switch open, and means operable in response to change in corresponding positions of said movable means and said manually operable means to determine the position of said element.

HENRY FELIX SOPER.